Feb. 20, 1968     J. R. HOLLOWELL     3,369,579
BATTERY WATER RESERVOIR
Filed July 6, 1965

INVENTOR
JOHN R. HOLLOWELL

BY *Olsen and Stephenson*
ATTORNEYS

United States Patent Office 3,369,579  
Patented Feb. 20, 1968

3,369,579  
BATTERY WATER RESERVOIR  
John R. Hollowell, Taylor, Mich., assignor to John Hollowell Engineering Division, Inc., Dearborn, Mich., a corporation of Michigan  
Filed July 6, 1965, Ser. No. 469,534  
2 Claims. (Cl. 141—310)

ABSTRACT OF THE DISCLOSURE

Apparatus including a conventional storage battery and a device for use therewith which serves as a reservoir for battery water for metering the water as needed to a cell of the battery and which also serves as a closure cap for the conventional opening to the cell. The device is a two-piece structure formed of semi-resilient plastic material, the first of the pieces is a cup-shaped receptacle with an integral, depending sleeve. The external surface of the sleeve is threaded so that the first piece can be threadedly secured in the conventional battery opening. The second of the pieces is a closed-top cylindrical container which also has a depending sleeve. The cylindrical container has a circumferential dimension allowing it to be snapped into a seated position in the cup-shaped portion of the receptacle and the container sleeve then projects through the receptacle sleeve terminating at the surface of the electrolyte in the battery so that battery water can be metered to the cell if the level of the electrolyte descends below the lower end of the container sleeve. The container can be removed from the receptacle for refilling, when necessary. Cooperating vent passageways are formed between the mating surfaces of the pieces for venting the battery without loss of liquid through such passageways.

This invention relates generally to storage batteries for automobiles and the like and more particularly to a device which serves as a reservoir for battery liquid.

Numerous devices have been proposed that replace the filler cap in a storage battery to serve as a reservoir for battery liquid. The reservoir device may also be arranged to indicate the liquid level in the battery. Since a conventional filler cap is vented to release gases produced by the electrolytic action in the battery and also to vent air into the battery when the level of the liquid in the battery drops, when the filler cap is replaced with a reservoir device, a vent must be provided in the reservoir device or the battery case must be otherwise modified to provide the necessary venting. One disadvantage in prior art devices is that the interior of the battery is vented directly to the ambient and the construction of the vent is such that liquid may splash out of the battery through the vent while dirt and other impurities may pass into the battery through the vent and contaminate the battery liquid. Where the reservoir device replaces a filler cap that is threaded in the battery case, it has been found desirable to construct the reservoir device so that it can be removed easily to facilitate adding liquid directly to the battery or to refill the reservoir in the device.

The objects of this invention are to provide a battery liquid reservoir device of the above-mentioned type that replaces the filler cap on commercially available batteries without the modification of the battery; that can be fastened in the filling opening of a battery and then partially disassembled in a simple and rapid manner when access to the battery through the filling opening is desired or when it is desired to refill the reservoir device with battery liquid; that achieves effective venting by a construction that is simple and inexpensive to manufacture while preventing battery liquid from splashing out of the battery and minimizing entry of dirt and other impurities into the battery.

Further objects, features and advantages of this invention will become apparent from a consideration of the following description, the appended claims, and the accompanying drawing in which:

Figure 1:
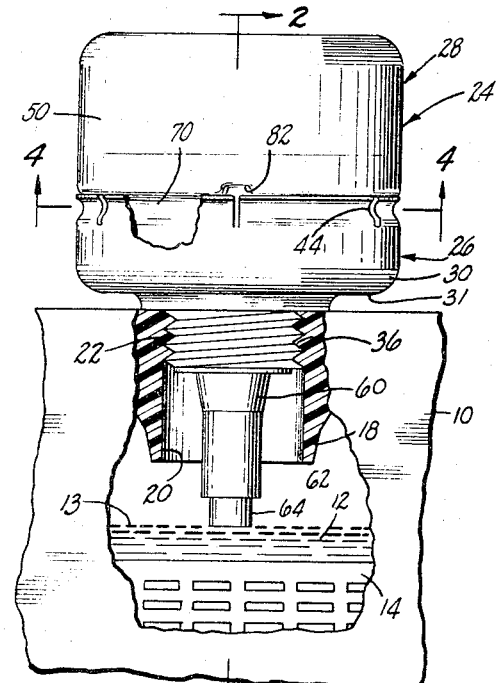
FIGURE 1 is a side view of a battery reservoir device constructed in accordance with the present invention and having a pair of telescopic members, the outer of which is threaded in a battery case shown in part with a portion of the case broken away.

Referring to FIG. 1, a battery case 10 of conventional design has a number of cells each of which is filled with electrolyte 12 to a normal level designated by numeral 13 above a plurality of battery plates 14. Case 10 is fashioned with a downwardly depending neck 18 having a central bore 20 formed with internal female threads 22 at its upper end. A battery liquid reservoir device 24 constructed in accordance with the present invention is threaded in neck 18 to provide a reservoir for battery liquid and also serve to indicate when the level of the battery liquid has dropped below its normal level 13.

The device generally comprises an outer member 26 which telescopically receives and supports an inner member 28. In the preferred embodiment members 26, 28 are made of semi-resilient plastic material. The member 26 generally comprises a cup-shape receptacle 30 having a bottom wall 31 which is joined by a thickened shoulder portion 32 to a downwardly depending integral sleeve 34. Sleeve 34 has external male threads 36 just below shoulder portion 32 which mate with threads 22 on neck 18 and a central bore 38 which flares gradually upwardly and outwardly and opens through the bottom wall 31 into receptacle 30. Receptacle 30 is also open at its upper end to receive member 28 and is fashioned with a circumferential rib 42 concaved radially inwardly of receptacle 30 just below the upper edge of the receptacle. Rib 42 forms a part of a snap-together connection between members 26 and 28. Receptacle 30 is fashioned with short vertical slits 44 which extend downwardly from the top edge of receptacle 30 through rib 42 so that rib 42 can flex outwardly to facilitate the snap-together connection.

Member 28 comprises a closed-top cylindrical container 50 which serves as a reservoir for battery liquid 52. A bottom wall 54 on container 50 is stepped radially inwardly and downwardly by means of two annular shoulders 56, 58. Shoulder 58 is in turn joined to a downwardly depending integral spout 60 which tapers radially inwardly in a direction downwardly from container 50 and terminates in a straight tubular portion 62. A short tubular extension 64 is disposed snugly in the bore of portion 62, as by means of a snap fit, and projects downwardly to the normal level 13 of the electrolyte 12 in the battery case 10. Container 50 is fashioned with a circumferential recess 70 that mates with rib 42 when shoulder 58 bottoms in receptacle 30 so that when container 50 is inserted into receptacle 30, rib 42 and recess 70 provide a snap-together connection to retain members 26, 28 assembled. Below recess 70, container 50 tapers slightly in a radially inwardly direction to facilitate inserting container 50 into receptacle 30. Assembly of container 50 with receptacle 30 is also facilitated by the flared bore 38 and the taper in spout 60.

Figure 2:
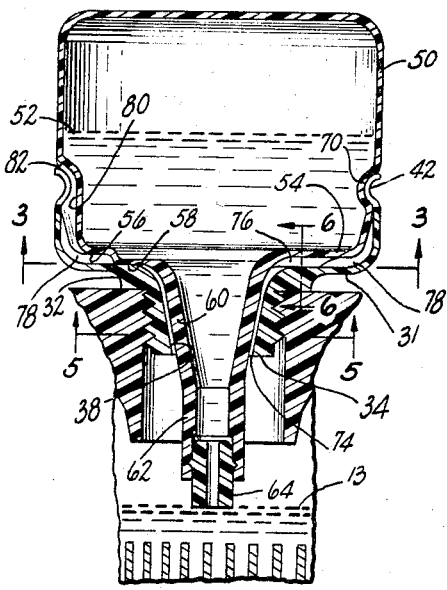
FIGURE 2 is a vertical section taken on line 2—2 of FIG. 1 to illustrate a snap-together connection between the two members and a labyrinth vent communicating between the atmosphere and the interior of the battery case when the reservoir device is mounted in the case.
Figure 4:
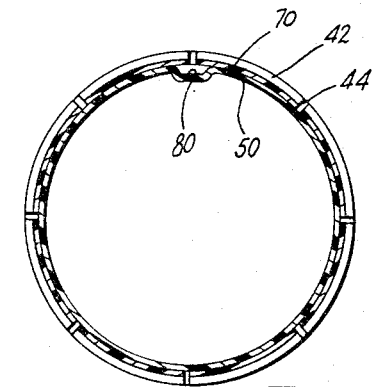
FIGURE 4 is a horizontal section taken on line 4—4 of FIG. 1.
Figure 3:
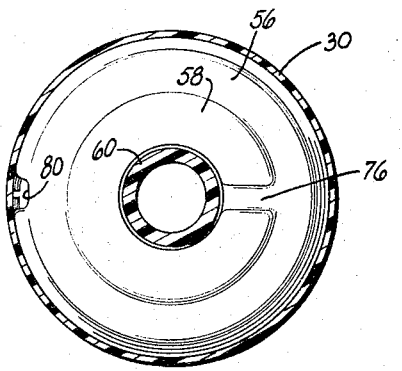
FIGURE 3 is a horizontal section taken on line 3—3 of FIG. 2.
Figure 5:
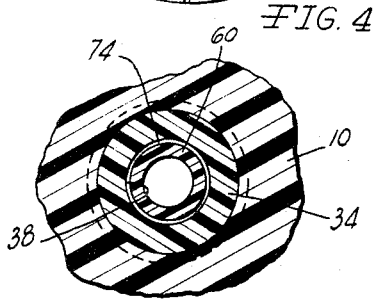
FIGURE 5 is a fragmentary horizontal section taken on line 5—5 of FIG. 2.
Figure 6:
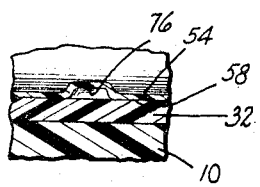
FIGURE 6 is a fragmentary vertical section taken on line 6—6 of FIG. 2.

The outside dimensions of spout 60 are such that when container 50 is nested snugly in receptacle 30, the spout is concentric with and spaced radially inwardly of bore 38 in sleeve 34 to provide an annular passageway 74 which opens at its lower end into the battery case 10 and extends upwardly to the bottom shoulder 58 on container 50. At one side of the bottom wall 54 of container 50, the right side as viewed in FIG. 2, shoulder 58 is fashioned with an upwardly concaved radial flute 76. Flute 76 communicates at its radially inner end with the annular passageway 74 and opens at its outer end into an annular chamber 78 formed between shoulder 56 and the bottom wall 31 when container 50 is nested in receptacle 30. At the side of container 50 diametrically opposite flute 76, container 50 is fashioned with a generally trough-shape recess 80 which extends upwardly from shoulder 56 above rib 42 and the top of receptacle 30 and then opens radially outwardly to form a port 82 communicating with the atmosphere. Thus when container 50 is nested in receptacle 30, port 82, recess 80, chamber 78, flute 76, and passageway 74 provide a labyrinth vent which winds between members 26, 28 and communicates between the interior of case 10 and the atmosphere to vent gases produced by electrolytic action in the battery and also vent air into the battery when the level of the liquid in the battery drops.

In the preferred embodiment member 28 is made of a transparent semi-resilient material such as polyethylene, so that the level of the liquid 52 in container 50 is visible from the outside of the device. The walls of container 50 have a thickness such that container 50 can be filled by squeezing the container and then releasing it to suck liquid into the container with the container returning to the shape illustrated in FIGS. 1 and 2 due to its own resiliency. On the other hand, container 50 is sufficiently rigid to provide a good snap-together connection with receptacle 30. To this end container 50 may be formed with an upper portion whose wall is thinner than the lower portion to achieve the desired flexibility required for filling the container while maintaining the desired rigidity to achieve an effective snap-together connection. Member 26 may also be made of polyethylene or other suitable material, and preferably is constructed more rigid than member 28 and particularly container 50, yet resilient enough to provide an effective snap-together connection.

In using one of the reservoir devices 24 described hereinabove, member 26 is first mounted in the battery filling opening of a conventional battery by tightly screwing sleeve 34 into case 10. Member 28 is filled by squeezing and releasing container 50 to draw water into the container through spout 60. Member 28 is then inserted into member 26 with spout 60 nested in spaced concentric relation to sleeve 34. During insertion of member 28 into member 26 rib 42 will flex outwardly until when shoulder 58 bottoms in receptacle 30, rib 42 snaps into recess 70 to releasably secure member 28 in member 26. The length of extension 64 is chosen such that the lower end of the extension is disposed at the desired normal level 13 of the electrolyte 12 in case 10 when container 50 bottoms in receptacle 30. If the level of the electrolyte 12 drops below the desired level 13, water from container 50 will flow slowly or gurgle through extension 64 into case 10 to maintain the electrolyte 12 at the level 13. With member 28 secured in member 26 passageway 74, flute 76, chamber 78, recess 80 and port 82 vent case 10 to the atmosphere. Visual inspection of container 50 will indicate when the water in container 50 is exhausted and thus when the electrolyte 12 has dropped below the desired level 13. In the absence of proper venting the liquid replenishing function of device 24 will be impaired and the presence of liquid in container 26 will not accurately indicate the level of the electrolyte 12. When the liquid in container 50 is exhausted, member 28 can be easily removed from member 26 by lifting member 28 to disengage rib 42 from recess 70. Container 50 may then be refilled and inserted into member 26 for continued use of the reservoir device 24.

It will be understood that the battery liquid reservoir which is herein disclosed and described is presented for purposes of explanation and illustration and is not intended to indicate limits of the invention, the scope of which is defined by the following claims.

What is claimed is:

1. A battery liquid reservoir device comprising first and second members telescoped together, said first member including a hollow cylindrical container having a top wall, a bottom wall and an upright side wall and having an integral spout depending from said bottom wall, said spout having a passageway communicating at its upper end with the interior of the container and an outlet at its lower end, said second member including a cup-shaped receptacle having a side wall and bottom wall with a centrally located aperture and having a sleeve portion depending from the bottom wall of the receptacle in surrounding relationship to the aperture and adapted to fit into a filling opening of a battery, said bottom wall and the lower portion of said upright side wall of said container being nested in said receptacle with said spout projecting downwardly through said sleeve in spaced generally concentric relation thereto, the space between said spout and said sleeve being in communication with the interior of a battery case when the sleeve is fitted into said filling opening, the side and bottom walls of said container and the side and bottom walls of said receptacle defining between them an annular chamber located below the bottom wall of the container and extending upwardly in surrounding relationship to the lower portion of the side wall of said container, an annular shoulder on the bottom wall of said container seated on the bottom wall of said receptacle marginally of said aperture and radially inward of said annular chamber, a radially disposed groove in said shoulder communicating at its inner end with the space between said sleeve and said spout and at its outer end with said annular chamber, a vertical groove between the side walls of said container and said receptacle above said chamber communicating at its lower end with said chamber and at its upper end with the atmosphere above said receptacle, said container having an annular groove in its side wall above said chamber, and said receptacle having a flexible peripheral returned lip portion at its upper edge seated in said annular groove for retaining said first member in its nested position in said second member.

2. A battery liquid reservoir device according to claim 1, wherein said vertical groove is disposed diametrically on the opposite side of said device from said radially disposed groove.

References Cited

UNITED STATES PATENTS

| 2,139,477 | 12/1938 | Townsend | 137—261 |
| 3,082,286 | 3/1963 | Schuster | 141—364 X |

FOREIGN PATENTS

| 320,026 | 9/1929 | Great Britain. |
| 551,867 | 3/1934 | Great Britain. |

LAVERNE D. GEIGER, *Primary Examiner.*

E. J. EARLS, *Assistant Examiner.*